May 27, 1952 — H. L. WHITLEY — 2,597,962
HAY HARVESTING APPARATUS
Filed Dec. 14, 1946 — 8 Sheets-Sheet 1

INVENTOR,
HARVEY L. WHITLEY
BY
ATTORNEY

May 27, 1952

H. L. WHITLEY 2,597,962

HAY HARVESTING APPARATUS

Filed Dec 14, 1946

INVENTOR,
HARVEY L. WHITLEY
BY
ATTORNEY

Fig-7

INVENTOR,
HARVEY L. WHITLEY
BY
ATTORNEY

May 27, 1952  H. L. WHITLEY  2,597,962
HAY HARVESTING APPARATUS
Filed Dec. 14, 1946  8 Sheets-Sheet 7

INVENTOR,
HARVEY L. WHITLEY
BY
ATTORNEY

Patented May 27, 1952

2,597,962

UNITED STATES PATENT OFFICE 2,597,962

HAY HARVESTING APPARATUS

Harvey L. Whitley, Fremont, N. C.

Application December 14, 1946, Serial No. 716,400

8 Claims. (Cl. 100—1)

1

This invention relates to a machine for cutting hay and other vegetation, and forming it immediately into bales of such a nature that the bales can be stacked in storage and will dry while in storage. The hay is packed into a roll which has a hollow portion extending longitudinally therethrough so that air can pass through the center of the bales as well as between the bales as the bales are circular in cross section, thus leaving spaces between the bales when they are piled one upon the other.

It is an object of this invention to provide a wheeled self-propelled vehicle having a cutter bar for cutting hay and other vegetation and having an endless conveyor for elevating the cut vegetation, and having means for rolling the cut vegetation into circular hollow bales and whereby, when a bale is completed, it can be moved to another position and properly secured against unwinding while another bale is being formed as the apparatus travels continuously over the field on which the vegetation is being cut.

It is another object of this invention to provide means for cutting hay and elevating it to a bale-forming apparatus and forming the bale into tubular form with means for raising the cutter bar when desired and transporting the apparatus from place to place, together with means for disconnecting the cutter bar from the driving means therefor as desired, and having individual brakes for each wheel for directing the same or for turning it in close quarters.

It is another object of this invention to provide a wheeled framework having a prime mover mounted thereon for propelling the framework over a field and said framework having projecting from the forward end thereof a cutter bar mechanism for cutting grass and other vegetation, together with a conveyor for conveying the cut vegetation upwardly into the machine, and said machine having apparatus for winding the cut vegetation into a spiral roll having a cavity extending longitudinally thereof and said bale of hay being formed on a reel member so that the reel can be moved to cause a new bale of hay to be formed while the already formed bale is being secured against unwinding and removed from the reel.

Some of the objects of the invention having been stated, other objects will appear as the description proceeds when taken in connection with the accompanying drawings, in which.

Referring more specifically to the drawing, numeral 10 indicates one of the angle members of the frame of the machine, and the numeral 11 indicates the other angle member. The front end of these members are secured by any suitable means, such as a U bolt 12 to an axle housing 13, having mounted therein conventional axles 14, on which suitable pneumatic tired wheels 15 and 16 are disposed, said axles projecting from a suitable differential housing 17.

The rear end of these bars 10 and 11 project upwardly and have secured thereto a cross angle bar 20. The front end of the frame members 10 and 11 have secured thereto, as by welding, vertically disposed angle bars 22 and 23. A cross front angle 33 is welded between the front ends of the frame members 30 and 31, and to the front surface of this cross angle 33 the vertical angles 22 and 23 are welded. The vertical angle 23, after passing the cross angle 33, extends downwardly and extends to the front end of bar 10. There is a short angle 34 welded to the front surface of cross angle bar 33, and having its lower end welded to the front end of angle frame bar 11. A brace angle bar 24 is welded to upright bar 23 and to horizontal brace bar 110. Brace bar 25 is welded to vertical bar 22 and to frame bar 30. An angle bar 36 is welded between the angle frame bars 10 and 31, respectively, and an angle bar 37 is welded between the frame bars 11 and 31, respectively. A cross bar 40 is mounted between the bars 10 and 11 for supporting a suitable heat exchange device, such as an automotive radiator 41. Also, suitable cross bars 42 and 43 are secured between the bars 10 and 11 for supporting an internal combustion motor 44.

Secured on the rear angle 20 is a bracket 45 having a castor fork 46 rotatably mounted therein, in which is mounted a pneumatic tired wheel 47 thereon. The fork 46 has an arm 48 extending forwardly therefrom. The wheel 47 is a steering wheel, and the steering mechanism associated with arm 48 will be later described.

Figure 15:
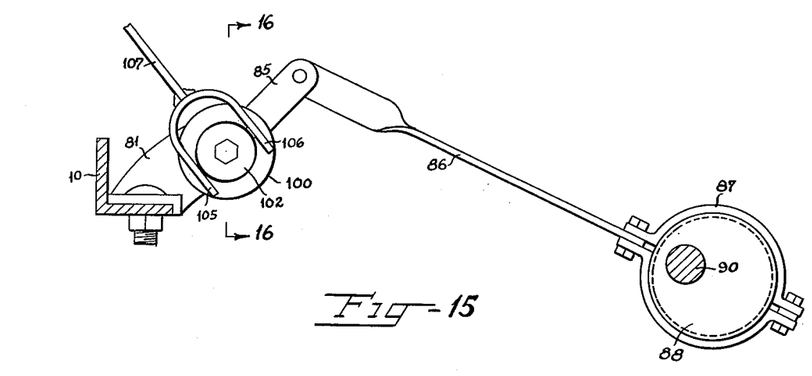
Figure 15 is a sectional view taken along the line 15—15 in Figure 2.
Figures 16, 19:
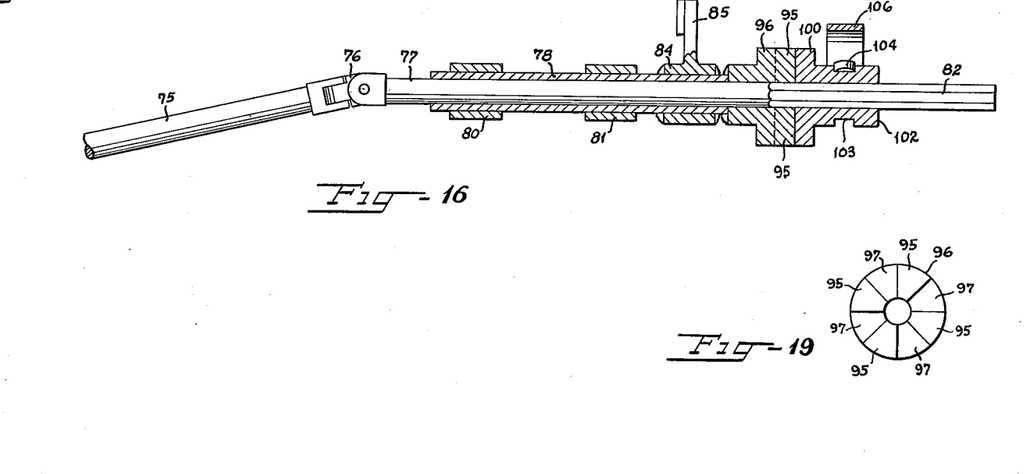
Figure 16 is a sectional view taken along the line 16—16 in Figures 2 and 15.
Figure 19 is an elevation of the clutch mechanism shown in section in Figure 16.

A cutter and elevator frame comprises a pair of angle bars 55 and 56, supported by brace bars 57, 58, 59 and 60, all joined together at their ends by welding, as at 61. To the angle bars 55 and 56 are welded the plates 62 and 63, which, at their rear ends, are pivoted to suitable angle brackets 64 and 65, secured on top of the cross angle bar 33. Secured between the forward ends of plates 62 and 63 is a cutter bar 66 which has oscillatably mounted therein a knife bar 68, having a plurality of knives 69 thereon which have movement in conventional guards 70 secured to the lower surface of the cycle bar 66 in a conventional manner. This knife bar 68 has a conventional projection 72 provided with a ball on its upper end, surrounded by one end of a conventional connecting link 73, which connecting link 73 has a socket on its other end surrounding a ball on the lower end of a crank 74 mounted on an oscillating shaft 75. Shaft 75, at its rear end, is connected to a universal joint 76, which joint is also connected to a shaft 77, which is loosely mounted in a sleeve 78, supported by bearings 80 and 81, secured to and extending from the lower frame bar 10. The rear end of shaft 77 is hexagonal in cross section, as shown at 82, in Figure 16. Secured, as by welding, on the sleeve 78 is a hub member 84, having an arm 85 integral therewith, as shown in Figures 15 and 16. This arm 85 has pivotally connected thereto a link 86 which is secured to a band 87, surrounding an eccentric cam 88, on a drive shaft 90, which is connected to the differential housing 17 at its front end and to a universal joint 91 at its rear end which, in turn, is connected to a conventional transmission mechanism 92 which in turn is connected to the internal combustion motor 44. Therefore, as the drive shaft 90 rotates, it will impart oscillatory movement to the member 84 and sleeve 78.

At the rear end of sleeve 78 there is welded one-half of a clutch member 96. There is a member 100 slidably mounted on the hexagonal portion 82. Each of the members 96 and 100 have male portions 95 and female cavities 97 so that when members 96 and 100 are moved to engaging position they will cause oscillation to be imparted from hub 96 to portion 100, which in turn will cause oscillation of the shaft 77 which imparts reciprocatory motion to the knife bar 68. (See Figure 19.)

Figures 1, 17:
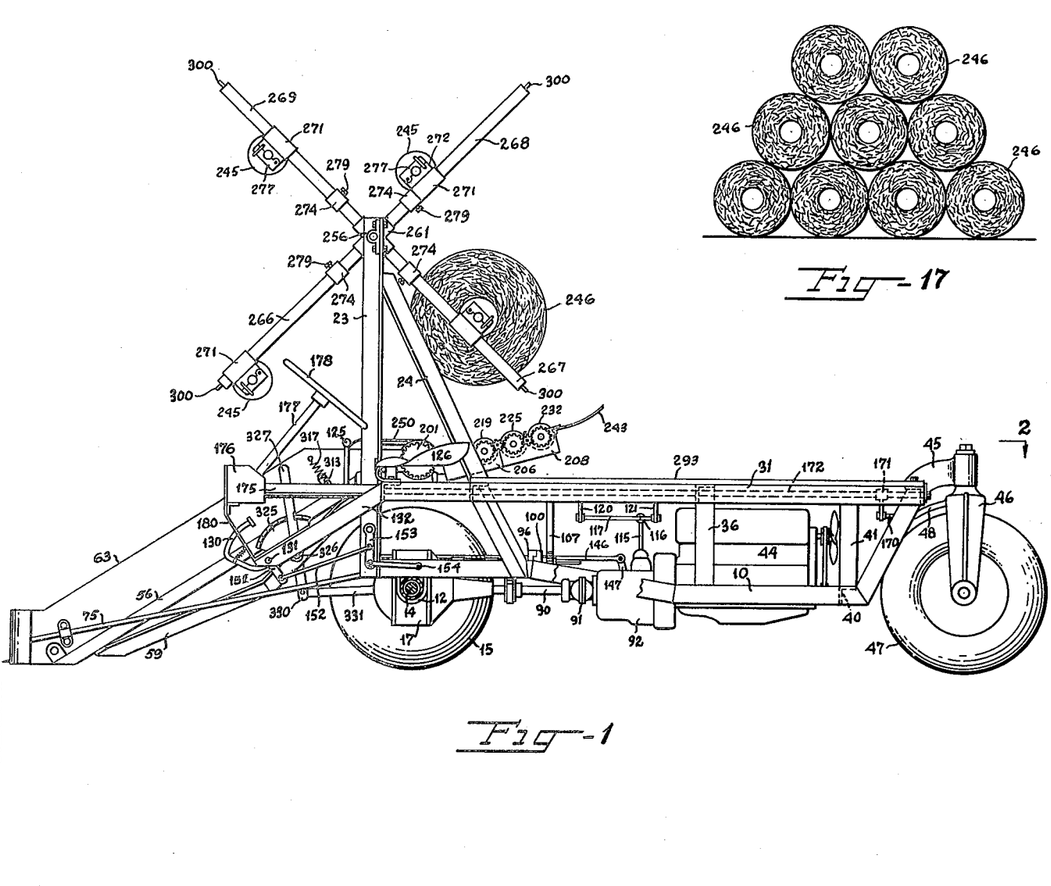
Figure 1 is an elevation of the left-hand side of the machine.
Figure 17 is an elevation showing a number of completed bales of hay in stacked position.
Figures 2, 18:
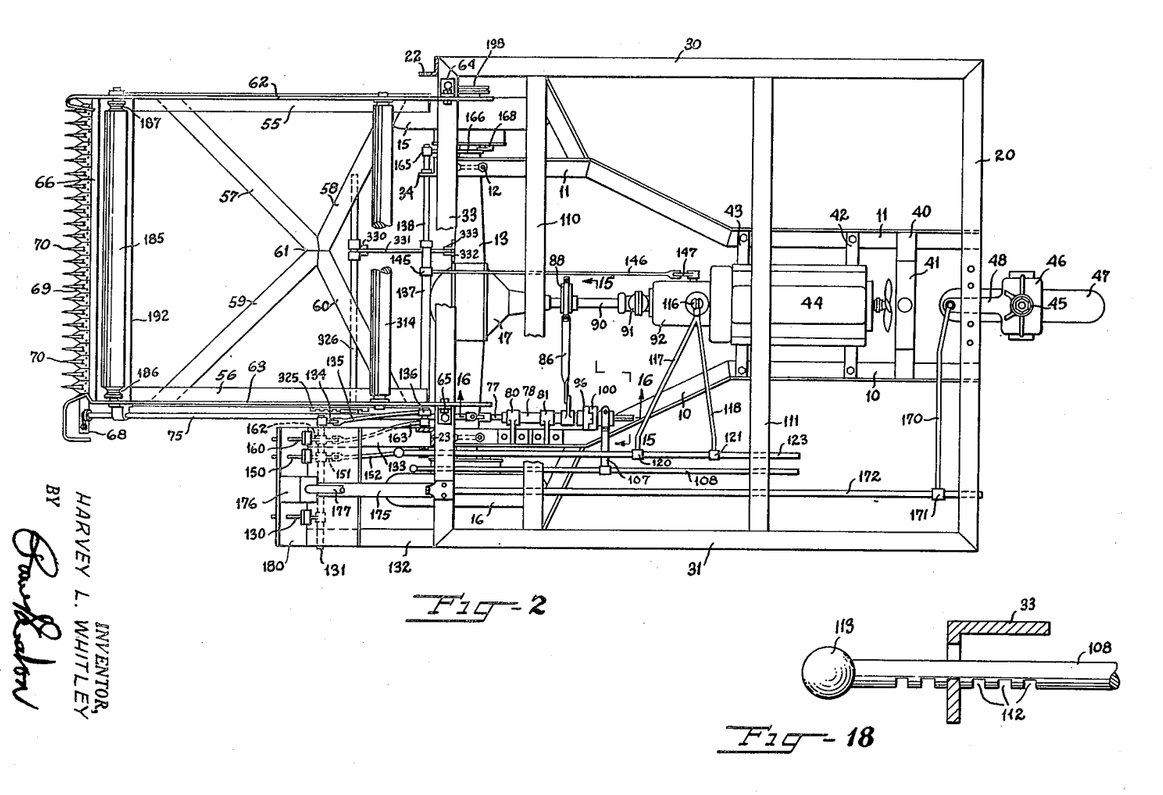
Figure 2 is a top plan view of the machine with parts broken away and looking downward in Figure 1, and taken along the line 2—2 in Figure 1 and omitting the platform boards, the reel mechanism and the bale forming mechanism.
Figure 18 is a detail of the means for securing the clutch pedal operating means in adjusted position.

The male clutch portion 100 has a restricted portion 102 provided with a peripheral groove 103, into which projections 104 on the two forks 105 and 106 of a forked lever 107 are adapted to loosely fit. The arm 107 is fixed on a rod 108 slidably mounted in the rear angle bar 33 and in cross angles 110 and 111, which join the frame members 30 and 31 to each other. The rod 108, where it passes through the angle 33, has a plurality of notches 112 in its lower surface (see Figure 18) so that the driver may seize the knob 113 on the front end of the rod 108, and move the clutch portion 100 into engaging or non-engaging position with clutch member 96 and then lower the front end of the shaft 108, which will cause the clutch to remain in clutched or non-clutched position.

The transmission 92 has extending upwardly therefrom a gear shift lever 115 which has connected thereto to its upper end by means of a universal connection 116 a pair of arms 117 and 118 which are pivotally connected to a pair of upwardly projecting arms 120 and 121, whose upper ends are welded to slidable and oscillatable rod 123 which is slidably and oscillatably mounted in the angle bars 111, 110 and 33. Immediately in front of the angle bar 33, the shaft 123 rises upwardly and has a knob 125 thereon, whereby the driver sitting in a seat 126 can seize the knob 125 and can slide the shaft 123 forwardly or rearwardly and can oscillate the shaft in either direction so that the gear shift lever can be moved to any desired gear position.

For manipulating the clutch of the transmission, a clutch pedal 130 is secured on a shaft 131 which has a downwardly projecting arm 134 which is connected to the front end of the link 135 whose rear end is connected to an arm 136 disposed on a sleeve 137 which is oscillatably mounted on a shaft 138, which is rotatably mounted in angles 23 and 34. Secured on sleeve 137 is a downwardly projecting arm 145, to which is pivotally secured the forward end of a link 146, whose rear end is pivotally secured to a clutch lever 147 of the transmission, and it is thus seen that the clutch lever 147 can be operated from the clutch pedal 130.

It is desirable to have individual brakes for the two wheels 15 and 16, in order that the apparatus can be turned on a short radius by applying brakes to one wheel at a time or, if desired, in going down an incline, brakes could be applied simultaneously by the two feet of the driver to both wheels at the same time. On shaft 131 there is oscillatably mounted a brake pedal 150, having an arm 151 extending downwardly therefrom, to which is connected a link 152, whose rearward end is connected to an arm 153 extending downwardly from the shaft 138, and to the lower end of arm 153 is pivotally connected a link 154 which extends rearwardly and is connected to a lever 155, mounted on a conventional cam shaft which extends into the brake housing, and has a conventional cam thereon for spreading the brake shoes associated with wheel 16.

For controlling the brake to the wheel 15, there is oscillatably mounted on the shaft 131 a brake pedal 160, which has a downwardly extending portion 162, to which is pivotally connected a link 163, which extends rearwardly and is connected to an arm 164 fixed on the shaft 138, and at the other end of the shaft 138 there is fixed an arm 165 which projects downwardly and is connected to a link 166, similar to link 154. Link 166 is connected to a lever 168 mounted on the cam shaft which extends into the interior of the brake housing associated with wheel 15.

For steering the vehicle, the rear steering wheel 47 has already been described. It has also been described as to how this castor fork 46, in which wheel 47 is mounted, has an arm 48 extending forwardly therefrom. To this arm 48 is pivotally connected a link 170 which is connected to a downwardly projecting arm 171 fixed on a shaft 172 which projects forwardly on the machine, being mounted for oscillation in the angle bars 20, 111, 110 and 33, respectively. This steering shaft 172, after passing through the angle bar 33, passes into a pipe 175 which is welded to the front face of angle bar 33 and on the front end of pipe 175 is welded a gear housing 176, having a suitable worm and gear mechanism therein connecting the shaft 172 to the steering rod 177, on which is disposed a steering wheel 178. This housing 176 is supported by a suitable floor board 180, extending down and being secured to angle bars 132 and 133.

Figure 13:
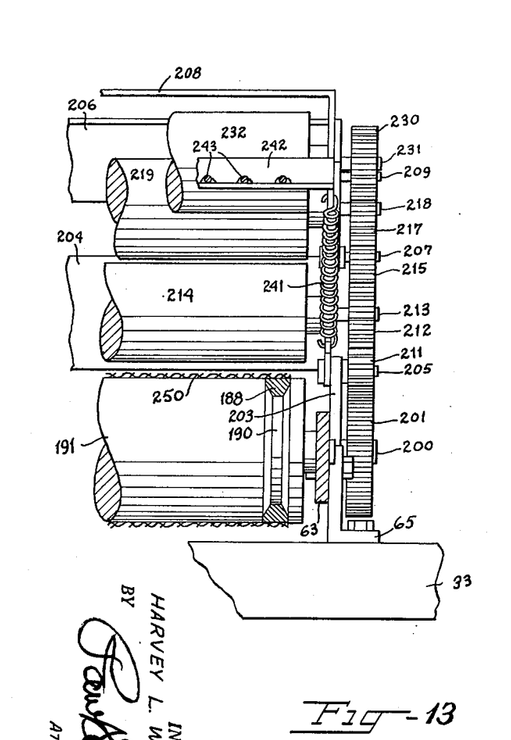
Figure 13 is a vertical sectional view taken along the line 13—13 in Figure 12.
Figure 14:
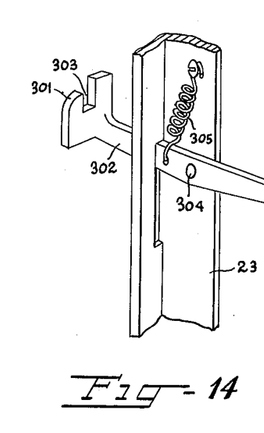
Figure 14 is an isometric detail view of the reel latching means shown in the lower right-hand portion of Figure 7.

In order to elevate the cut vegetation after it is cut by the knives 69, I have provided between the forward ends of the plates 62 and 63 an idler roller 185 which is rotatably mounted in the side plates 62 and 63 and having grooves 186 and 187 near opposite ends thereof in which V-belts 188 and 189 are disposed. These V-belts have secured thereon an endless conveyor belt 250. Secured between the front end of angle bars 55 and 56 is a protecting plate 192. The V-belts 188 and 189 are also mounted in grooves 190, disposed near opposite ends of a roller 191, only one end of which is shown in Figure 13, but the other end is identical. The roller 191 is an idler roller and the belts at their rear ends are mounted in a roller 193 having similar grooves in each end thereof. The side plates 62 and 63 extend rearwardly past the vertical posts 22 and 23 and the roller 193 is rotatably mounted in the rear ends of these plates 62 and 63. The roller 193 has a shaft 195 projecting from one end thereof through plate 62 and has a V-pulley 196 secured thereon, on which is mounted a V-belt 197 which is disposed on a V-pulley 198, secured on the exterior of wheel 15. An idler pulley 199 keeps belt 197 taut at all times since it is urged against the belt 197 by means of a tension spring 194.

Figure 12:
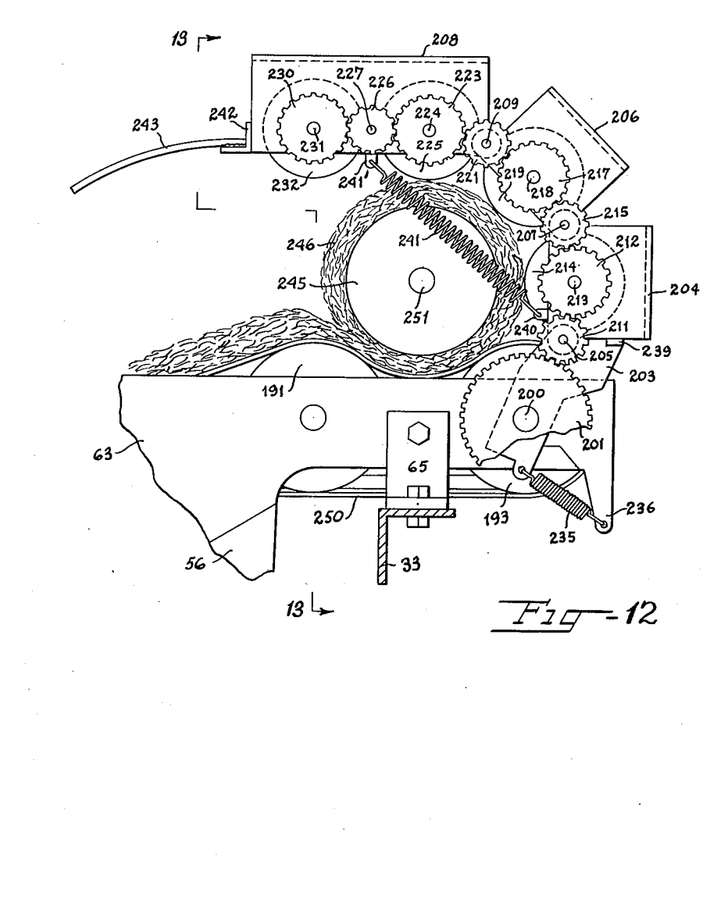
Figure 12 is an elevation of one end of the bale forming mechanism.

On the end of the roller 193, remote from the pulley 196, is a shaft 200, which projects through the rear portion of plate 63, having fixed thereon a pinion 201, and pivotally mounted at each end of the roller 193 on shafts 195 and 200, are members 203, which have pivotally connected thereto members 204 by means of a pivot 205, the members 203 and 204 having ears projecting therefrom penetrated by the pivot 205. The member 204 has pivotally connected thereto a member 206, members 204 and 206 having ears projecting therefrom, penetrated by a pivot pin 207. Member 206 is connected to members 208 by means of ears projecting therefrom penetrated by a common pivot pin 209. The pivot pin 205 has rotatably mounted thereon a pinion 211 which not only meshes with pinion 201 but also with pinion 212 fixed on a shaft 213 projecting from each end of a roller 214 rotatably mounted in the member 204. The pinion 212 meshes with a pinion 215, rotatably mounted on pivot pin 207 and the pinion 215 meshes with a pinion 217 disposed on the shaft 218 projecting from one end of a roller 219. The pinion 217 meshes with a pinion 221, mounted on a pivot pin 209, and pinion 221 also meshes with a pinion 223 fixed on a shaft 224, projecting from a roller 225. Pinion 223 meshes with an idler pinion 226, mounted on a pin 227 in member 208, and this pinion 226 meshes with a pinion 230, fixed on a shaft 231 projecting from one end of a roller 232. It is evident that both ends of all of said rollers and the members 203, 204, 206 and 208 are identical, and the pivots 205, 207 and 209 are identical at each side of the apparatus, and like reference characters will apply, but of course there would be no pinions except on one end of the apparatus, such as just has been described. The members 203 are urged in a counter-clockwise direction in Figure 12 by means of tension springs 235 secured to the lower ends of the members 203 and to spring perches 236.

The members 204 and 208 have spring perches 240 and 241' thereon, to which the two ends of compression springs 241 are secured to cause the members 206 and 208 to pivot in a counter-clockwise manner. The members 203 have projections 239 which cause them, when urged in a counter-clockwise direction by springs 235, to urge the members 204 also in a counter-clockwise direction.

The front end of members 208 have secured thereto, and extending between the same, an angle bar 242 which has secured thereto a plurality of forwardly and downwardly projecting tines 243 for assisting in guiding the cut vegetation into rolling or baling position. This baling is done by a roller 245 around which the cut vegetation is wound in spiral to form a bale 246. The vegetation is fed thereto by the endless conveyor 250 as this roller 245 rides on the top of the top leaf thereof, the conveyor being secured to the exterior surfaces of the V-belts 188 and 189.

The roller 245 has projecting from each end thereof a stub shaft 251 for supporting the roller 245. I provide bearings 255 and 256 on the upper ends of the angle bars 22 and 23, in which stub shafts 257 and 258 have rotative movement. These stub shafts have their other ends welded to four-way couplings or cross members 260 and 261, and four pipes 262, 263, 264 and 265 extend from cross member 260, while four pipes 266, 267, 268 and 269 extend from cross member 261. An axially disposed pipe 270 connects the couplings 260 and 261.

Slidably mounted on each of these pipe members is a sleeve 271, to which is welded a bearing block member 272 having a semi-circular cavity 273 thereon. The block member 272 has an upwardly projecting portion 275 penetrated by a pivot bolt 276 which penetrates the forked end of an upper bearing block 277 which also has a semi-circular bearing portion 278 therein mating with bearing portion 273. I provide a link 280, pivoted as at 281, on each side of the block 272, and its upper end is adapted to engage in a depression 282 to lock the bearing block 277 in the position shown in Figure 4.

Each of the four pipes on one side of the reel apparatus where these bearing blocks 272 are disposed have mounted on the pivot pin 276 a dog 285 biased by a spring 286 to engage a ratchet wheel 287 fixed on one of the stub shafts 251 extending from one end of the rollers 245. These dogs 285 engage the ratchet wheels 287 to prevent rotative movement of the rollers 245 and the vegetation thereon when they are in position ready to have securing means passed therearound to prevent unwinding of the hay or the vegetation thereon.

Figures 5, 6:
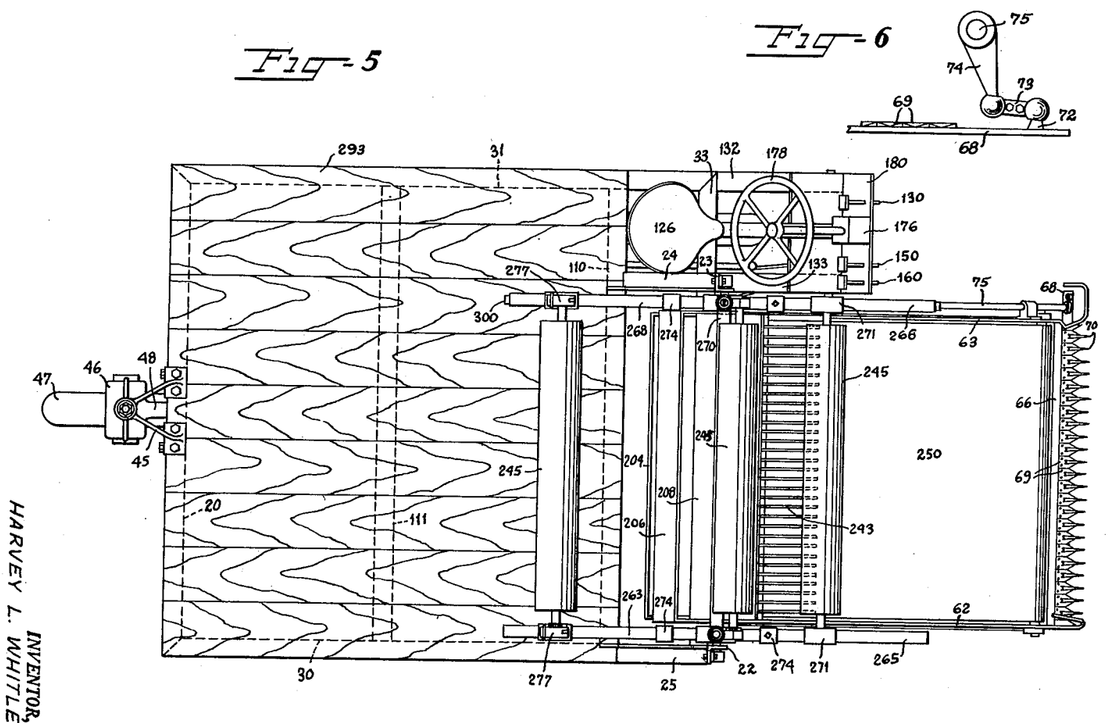
Figure 5 is a top plan view of the machine looking downward in Figure 3.
Figure 6 is a detail of the cutter bar driving means.
Figure 7:
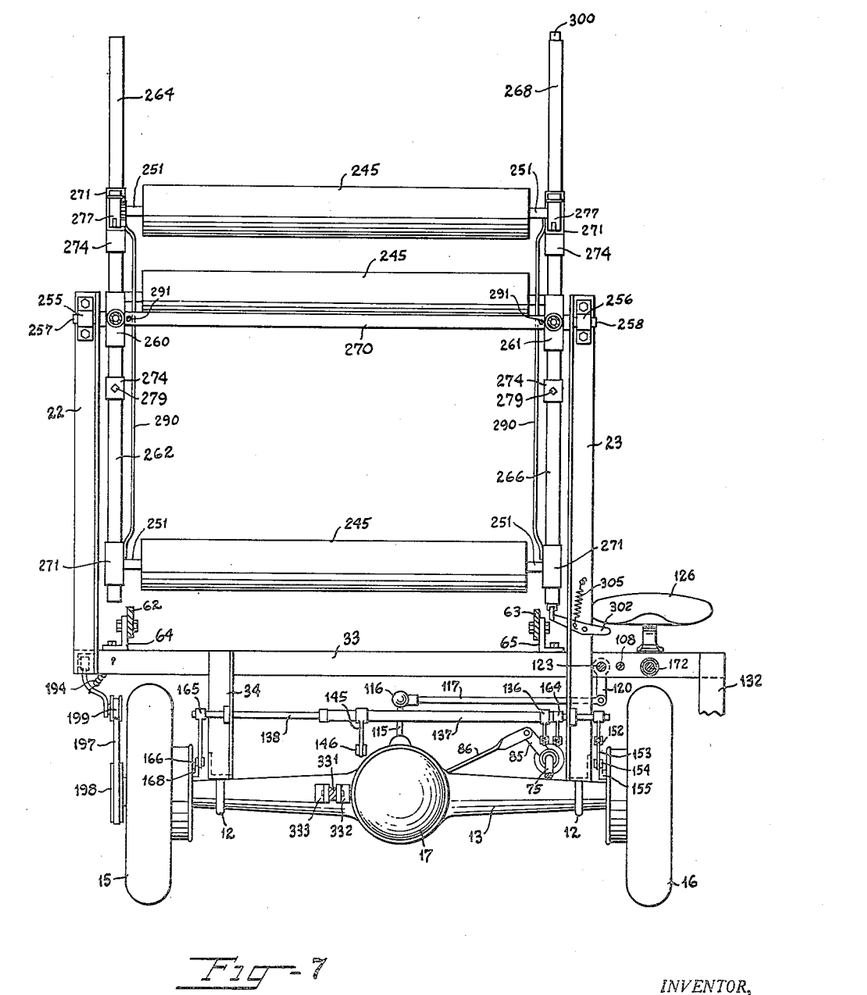
Figure 7 is a vertical sectional view taken along the line 7—7 in Figure 3.

The bearing blocks 272 disposed on the pipes, such as 262 to 265, inclusive, which extend in opposite directions from each other or in alinement with each other have secured thereto connecting means, such as rods 290 and 291 so as to enable them to slide downwardly in pairs on both sides of the machine to cause the lowermost roller 245 to engage the conveyor belt 250. When a proper amount of vegetation has been wound onto a roller 245, to make the proper sized bale, the operator seizes the portion 208 or angle bar 242 and pivots all of the portions 208, 206, 204 and 203 in a clockwise manner in Figure 12 to where they will be projected rearwardly and be disposed a slight distance above a platform 293 secured on top of the angle bar framework shown uncovered in Figure 2, and the platform being shown in position over the angle bar framework in Figure 5. At this point, with the mechanism shown in Figure 12 projected forwardly, the bale of hay, along with its associated roller 245, will be raised upwardly and rearwardly to the position shown in Figure 3, at which time the bearing blocks 277 can be pivoted from off of bearing blocks 272, and the bale, together with the roller 245, can be removed. When the roller 245 is removed from the bale and placed back in position in the bearing blocks 272 and 277, they will be locked in position and then the bearing blocks on the horizontally disposed pipes will be projected forwardly to where the forward bearing blocks disposed on two horizontal pipes will be ready to move down into engagement with the conveyor belt 250 for the forming of another bale of hay. The outer ends of each of these pipes on one side of the reel have projecting portions 300, and when a roller 245 is moved to the lowermost position onto the top of the conveyor 250, these projecting portions 300, having outwardly sloping surfaces, will ride over the sloping surface 301 of a lever 302 and fall into a notch 303 in the lever, which will hold the reel in position while the next bale of hay is being formed. This lever 302 is pivoted as at 304 in upright angle bar 23, and is normally biased to cause its end having the slot 303 therein to move upwardly at all times by means of a tension spring 305.

Figures 3, 4:
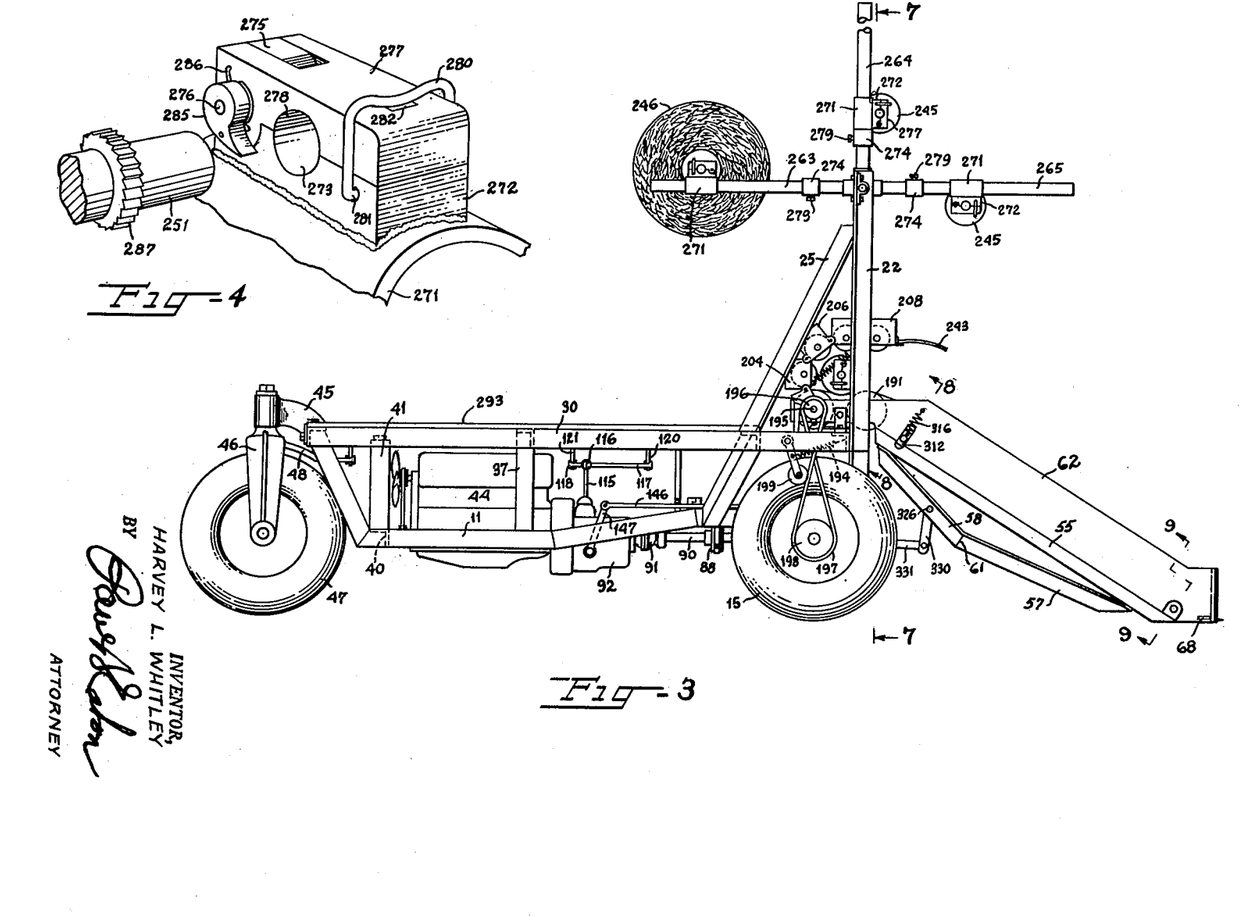
Figure 3 is an elevation of the right-hand side of the machine.
Figure 4 is an enlarged isometric detail view of the means on the reel for securing each end of the trunnions on which the bale or bales of hay are formed.
Figure 8:
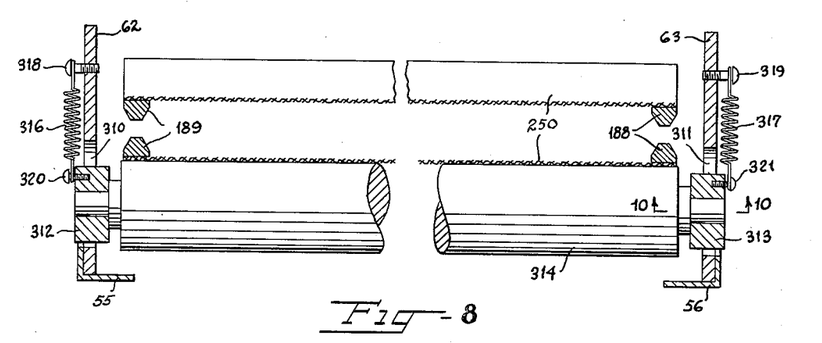
Figure 8 is a sectional view taken along the line 8—8 in Figure 3.
Figure 9:
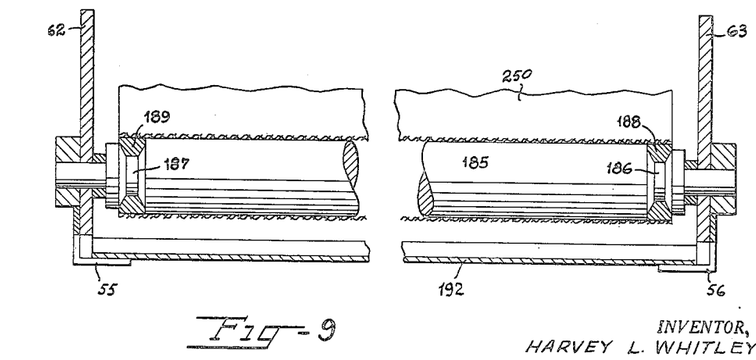
Figure 9 is a sectional view taken along the line 9—9 in Figure 3.
Figure 10:
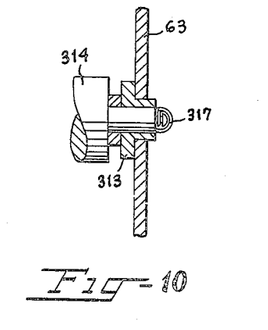
Figure 10 is a sectional view taken along the line 10—10 in Figure 8.
Figure 11:
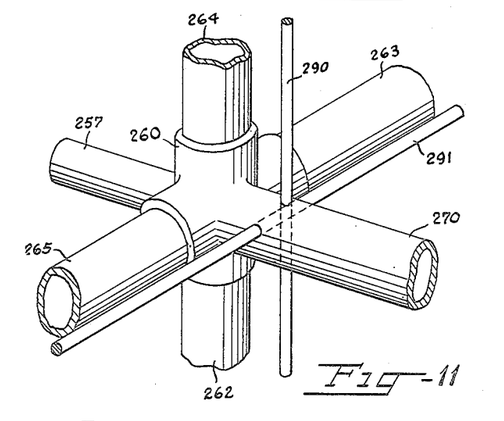
Figure 11 is an isometric detail view of one end of the center portion of the reel mechanism.

By referring to Figures 3 and 8, it is seen that the plates 62 and 63 have slots 310 and 311 therein, in which is mounted for sliding movement bearing blocks 312 and 313. In these bearing blocks 312 and 313 is rotatably mounted an idler roller 314. The lower leaf of the conveyor 250 rests on this idler roller 314, and the idler roller is urged upwardly by tension springs 316 and 317, secured to spring perches 318 and 319 at their upper ends and to spring perches 320 and 321 at their lower ends, which latter spring perches are mounted in the bearing blocks 312 and 313. The purpose of this roller is to take up any slack in the conveyor belt 250, and it also prevents the conveyor belt 250 from engaging the cross angle bar 33 as it elevates the lower leaf of the conveyor belt sufficiently to cause it to miss the cross angle bar 33 during operation of the machine.

In order to raise the cutter bar from the ground when it is desired to transport the machine from place to place, means are provided for quickly effecting the raising of the entire conveyor mechanism, including the cutter bar, on its pivots, which comprise the angle brackets 64 and 65. This raising mechanism comprises a quadrant 325 welded to the outer surface of angle bar 56 and which has oscillatably mounted in its lower portion a shaft 326 having a lever 327 fixedly secured thereon and which lever 327 has an inturned lip adapted to engage the teeth in the quadrant 325. The shaft 326 is rotatably mounted in angle bars 58 and 60, and between the angle bars 58 and 60 there is fixed on the shaft 326 a downwardly extending arm 330 which has pivotally secured to the lower end thereof a link 331 whose front end is pivoted between angle brackets 332 and 333, secured on the axle housing 13. It is, therefore, seen that as the lever 327 is moved forwardly, the front end of the angle bars 55 and 56 will be raised off the ground, thus raising the cutting mechanism as well as the front end of the conveyor 250.

Each of the arms 262 to 269 inclusive has adjustably mounted thereon, by means of a setscrew 279, a cuff 274 which limits the inward sliding movement of the bearing blocks 271.

In the drawings and specification, there has been set forth a preferred embodiment of the invention, and although specific terms are employed, they are used in a generic and descriptive sense only, and not for purposes of limitation, the scope of the invention being defined in the claims.

I claim:

1. An improvement in apparatus for cutting and baling vegetation having a wheeled frame provided with a cutter bar secured thereto and projecting forwardly therefrom and having a prime mover mounted on the frame and having an endless conveyor disposed rearwardly of the cutter bar and projecting upwardly into the frame for delivering the cut vegetation onto the front portion of the frame, said improvement comprising a reel mounted in the frame and having a plurality of rollers rotatably mounted therein, one of said rollers at a time being adapted to be swung into close proximity to the rear end of the conveyor, contact with the conveyor serving to rotate the roller and the vegetation wound thereon, and additional means for driving the roller when it reaches a position adjacent the rear end of the elevating means to wind the cut vegetation therearound, said roller being removable from the bale of vegetation to thus provide a cylindrical bale of vegetation.

2. An improvement in a hay harvester having a wheeled framework provided with a prime mover thereon and having a cutter frame pivoted at its rear end to the front portion of the wheeled framework and having a cutter bar and cutter knife mounted in the front end thereof, said cutter frame having an endless conveyor belt mounted therein and extending from immediately in the rear of the cutter bar to the front portion of the wheeled framework, said improvement comprising a rotatable reel member having a plurality of rollers mounted therein, one of said rollers at a time being adapted to engage the front upper portion of the conveyor belt to be driven by the conveyor belt for winding the cut vegetation therearound which is elevated by the endless conveyor, a plurality of driven rollers and tension means for moving them into contact with the vegetation being wound onto the rollers in the reel member, and means for latching the reel member in position while vegetation is being wound around its lowermost roller in contact with the endless conveyor, said reel member being movable to another position to cause a new roll to engage the conveyor belt for winding vegetation therearound while the bale of vegetation wound on the preceding roll is secured against unwinding for removal from the roller on which it is wound.

3. An improvement in apparatus for cutting and baling green vegetation having a wheeled framework and having a prime mover mounted on the wheeled framework said apparatus also having a cutter frame pivotally mounted at its rear end to the front end of the wheeled framework, said cutter frame having a cutter knife and cutter bar mounted on the front end thereof, said apparatus also having an endless conveyor belt mounted in the cutter frame and extending rearwardly and upwardly onto the front top portion of the wheeled framework, said improvement comprising a reel member mounted on the wheeled framework above the rear end of the endless conveyor and having a plurality of bearings slidably mounted thereon, each set of bearings having mounted therein a roll member, a set of bearings together with its roll being adapted to slide downwardly on the reel member to engage the rear end of the conveyor belt, means for latching the reel in position while its lowermost roll is rotated by contact with the conveyor belt to wind the cut vegetation therearound, and a plurality of driven rollers biased to engage the periphery of the lowermost roll and the vegetation being wound therearound, said rollers engaging the vegetation being swingable out of contact with the vegetation wound onto the lowermost roll to permit the reel to be rotated to another position to cause another roll to contact the rear upper portion of the conveyor belt while the vegetation wound on the preceding roll is secured against unwinding and is removed from the roll.

4. An improvement in apparatus for cutting vegetation and forming the same into tubular bales having a wheeled framework, and also having a cutter assembly mounted on the framework and also having elevating means associated therewith for elevating the cut vegetation onto the framework, said improvement comprising a reel member mounted for rotation on the wheeled framework and having a plurality of idler rollers slidably mounted thereon and adapted by gravity to move downwardly when the reel is turned to cause one of the rollers to engage the elevating means to be rotated thereby and to wind the cut vegetation around the roller in contact with the elevating means, means for latching the reel against movement while the lowermost roller is in contact with the elevating means, and pressure-applying means for applying presure to the vegetation as it is being wound onto the roller, said pressure-applying means being movable away from the bale of vegetation being wound onto the roller so that the reel can be rotated to move the formed bale away from the elevating means and to move another roller into contact with the elevating means for the formation of a new bale while the previously formed bale is removed from the roller on the reel to thus provide a tubular bale of vegetation to allow passage of air therethrough to cure the same when it is stored.

5. An improvement in apparatus for harvesting hay and baling the same having a power-driven wheeled framework and also having a cutter framework pivoted to the front end of the frame and projecting forwardly and downwardly and having a cutter bar disposed on its front end, said cutter framework having an endless conveyor for receiving the cut vegetation and elevating it upwardly and rearwardly into the frame, said improvement comprising means disposed at the rear end of the conveyor and driven by contact with the conveyor for winding the cut vegetation into a spiral formation to form a bale of the cut vegetation, and a plurality of spring-pressed rollers for engaging the vegetation as it is being wound into spiral formation to form a bale.

6. An improvement in a hay harvester having a wheeled framework provided with a cutter frame pivoted at its rear end to the front portion of the wheeled framework and having a cutter bar and cutter knife mounted in the front end thereof, said cutter frame having an endless conveyor belt mounted therein and extending from immediately in the rear of the cutter bar to the front portion of the wheeled framework, said improvement comprising a reel member having a plurality of rollers mounted therein, one of said rollers at a time being adapted to engage the front upper portion of the conveyor belt to be driven by the conveyor belt for winding the cut vegetation therearound which is elevated by the endless conveyor, a plurality of driven rollers, tension means for moving the driven rollers into contact with the vegetation being wound onto the roller in the reel member, means for latching the reel member in position while vegetation is being wound around its lowermost roller in contact with the endless conveyor, said reel member being movable to another position to cause a new roller to engage the conveyor belt for winding vegetation therearound while the bale of vegetation wound on the preceding roller is secured against unwinding for removal from the roller on which it is wound.

7. An improvement in apparatus for cutting and baling green vegetation having a wheeled framework, and having a cutter frame pivotally mounted at its rear end to the front end of the wheeled framework, said cutter frame having a cutter knife and cutter bar mounted on the front end thereof, said cutter frame having an endless conveyor belt mounted therein and extending rearwardly and upwardly onto the front top portion of the wheeled framework, said improvement comprising a reel member mounted on the wheeled framework above the front end of the endless conveyor and having a plurality of sets of bearings slidably mounted thereon, each set of bearings having mounted therein a roll member, a set of bearings together with its roll being adapted to slide downwardly on the spokes of the reel member to engage the front end of the conveyor belt, means for latching the reel in position while its lowermost roll is rotated by the contact with the conveyor belt to wind the cut vegetation therearound, a plurality of driven rollers biased to engage the periphery of the lowermost roll and the vegetation being wound therearound, said driven rollers engaging the vegetation being swingable out of contact with the vegetation wound onto the lowermost roll to permit the reel to be rotated to another position to cause another roll to contact the front upper portion of the conveyor belt while the vegetation wound on the preceding roll is secured against unwinding and is removed from the reel.

8. An improvement in apparatus for cutting and harvesting green hay having a wheeled frame provided with a cutter frame pivotally mounted at its rear end to the front end of the wheeled frame and extending downwardly toward the ground, said cutter frame having a cutter knife and cutter bar assembly mounted in the front end thereof, said cutter frame having an endless conveyor mounted therein for conveying the cut hay upwardly onto the front end of the wheeled frame, said endless conveyor having a roller at its front end adjacent the cutter bar and having a roller adjacent its rear end, said improvement comprising a reel member mounted on the front end of the wheeled frame at a point above the front end of the conveyor and having a plurality of arms extending therefrom, and each arm having slidably mounted thereon a bearing, a plurality of rollers mounted in said bearings and said bearings being adapted to slide downwardly to cause an associated roller to engage the front end of the conveyor to be rotated thereby to wind the cut vegetation around the roller, a plurality of pressure-applying rollers adapted to encircle at least one-half of the periphery of the roller in contact with the conveyor belt for assisting in winding the cut hay around the roller to form a tubular bale of hay, and means for latching the reel against movement while the lowermost roller is in contact with the conveyor belt, the roller having the bale of hay wound therearound being adapted to be moved to a new position upon movement of the reel to cause another roller to contact the conveyor belt to wind the hay therearound while the previously formed bale is removed from the roller in the reel to thus provide a tubular bale of hay.

HARVEY L. WHITLEY.

REFERENCES CITED

The following references are of record in the file of this patent:

UNITED STATES PATENTS

| Number | Name | Date |
|---|---|---|
| 799,175 | Luebben | Sept. 12, 1905 |
| 1,069,112 | Cook | Aug. 5, 1913 |
| 1,213,284 | Slathar | Jan. 23, 1917 |
| 1,227,355 | Wright | May 22, 1917 |
| 1,330,733 | Britt | Feb. 10, 1920 |
| 1,442,383 | Collins | Jan. 16, 1923 |
| 1,763,542 | Schoenberg | June 10, 1930 |
| 2,048,940 | MacGregor | July 28, 1936 |
| 2,157,261 | Innes | May 9, 1939 |
| 2,469,580 | Scranton | May 10, 1949 |
| 2,581,542 | Kolzing | Jan. 8, 1952 |